(12) United States Patent
Vasseur et al.

(10) Patent No.: US 8,743,768 B2
(45) Date of Patent: Jun. 3, 2014

(54) ON-DEMAND DIVERSE PATH COMPUTATION FOR LIMITED VISIBILITY COMPUTER NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 13/405,895

(22) Filed: Feb. 27, 2012

(65) Prior Publication Data

US 2013/0223275 A1 Aug. 29, 2013

(51) Int. Cl.
*H04H 20/71* (2008.01)

(52) U.S. Cl.
USPC ........... 370/312; 370/252; 370/264; 370/392; 370/475

(58) Field of Classification Search
USPC .......................... 370/312, 252, 264, 392, 425
See application file for complete search history.

(56) References Cited

U.S. PATENT DOCUMENTS

| | | | |
|---|---|---|---|
| 8,004,960 B2 | 8/2011 | Raj | |
| 8,027,258 B2 * | 9/2011 | Mizutani et al. | 370/236 |
| 8,189,588 B2 | 5/2012 | Yadav et al. | |
| 8,249,069 B2 | 8/2012 | Raman et al. | |
| 8,300,538 B2 * | 10/2012 | Kim et al. | 370/238 |
| 2008/0304472 A1 | 12/2008 | Gourlay et al. | |
| 2009/0228575 A1 * | 9/2009 | Thubert et al. | 709/220 |

OTHER PUBLICATIONS

Vasseur, et al., "A Per-Domain Path Computation Method for Establishing Inter-Domain Traffic Engineering (TE) label Switched paths (LSPs)", IETF Network Working Group, Request for Comments 5152, Feb. 2008, 22 pages.
Vasseur, et al., "A Backward Recursive PCE-Based Computation (BRPC) Procedure to Compute Shortest Constrained Inter-Domain Traffic Engineering Label Switched Paths", IETF Network Working Group, Request for Comments 5441, Apr. 2009, 19 pages.
Winter, et al., "RPL: IPv6 Routing Protocol for Low Power and Lossy Networks", draft-ietf-roll-rpl-19, IETF Internet-Draft; Mar. 2011, 164 pages.

* cited by examiner

*Primary Examiner* — Huy D Vu
*Assistant Examiner* — Kuo T Chiang
(74) *Attorney, Agent, or Firm* — Edwards Wildman Palmer LLP; James M. Behmke; Kenneth J. Heywood

(57) ABSTRACT

In one embodiment, a source device detects a packet flow that meets criteria for multi-path forwarding, and forwards a probe packet on a primary path from the source device to a destination device, the probe packet carrying an indication to cause a plurality of transit devices along the primary path to add their respective local neighbor topology to the forwarded probe packet, and also to cause the destination device to compute a diverse path from the primary path based on the accumulated local neighbor topologies in the probe packet. Accordingly, the source device may receive a returned diverse path as computed by the destination device in response to the probe packet, and may thus forward the packet flow on the primary path and the diverse path from the source device to the destination device according to the multi-path forwarding.

19 Claims, 15 Drawing Sheets

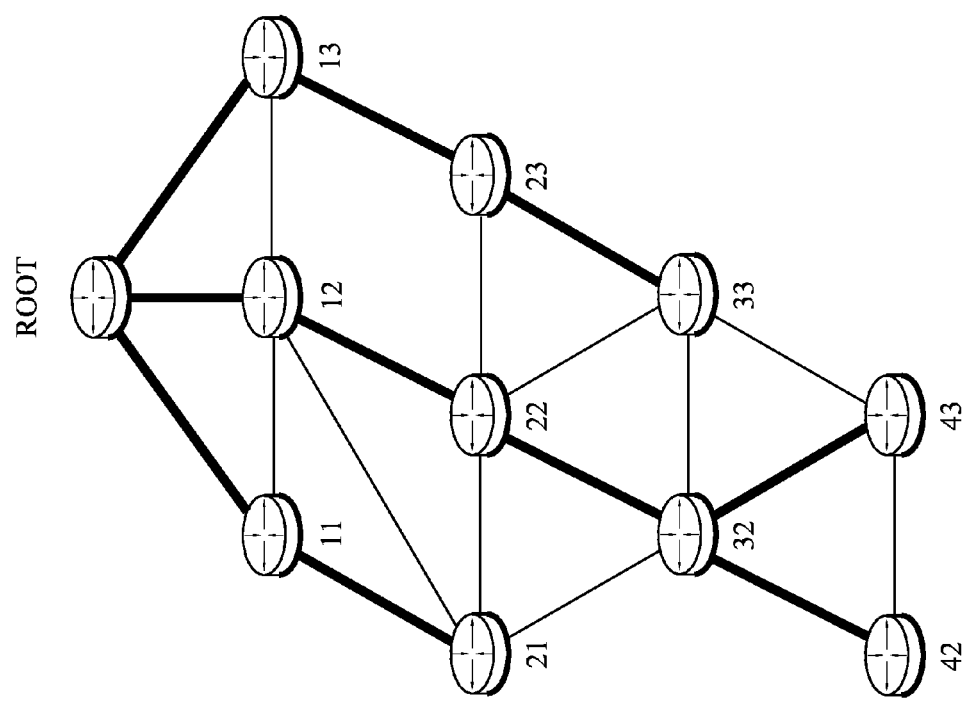
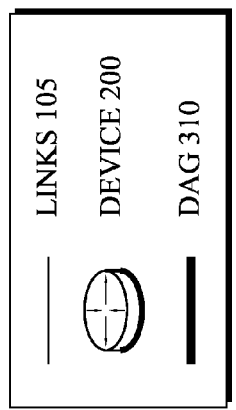
FIG. 3

US 8,743,768 B2

ON-DEMAND DIVERSE PATH COMPUTATION FOR LIMITED VISIBILITY COMPUTER NETWORKS

TECHNICAL FIELD

The present disclosure relates generally to computer networks, and, more particularly, to diverse path computation for multi-path forwarding in limited visibility computer networks.

BACKGROUND

Low-power and Lossy Networks (LLNs), e.g., sensor networks, have a myriad of applications, such as smart grid, smart cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. Also, links are usually shared (e.g., using wireless mesh or powerline communication (PLC) is networks) and provide very limited capacity (from a few Kbits/s to a several dozens of KBits/s).

The computation of diverse paths is a well-known technical challenge in networks using distance vector routing protocols, such as many LLN routing protocols. The ability to build diverse paths is important for the Internet of Things (IoT) for a number of critical/real-time applications where "1+1" techniques consisting of duplicating critical packets and sending them along diverse paths is a strong requirement. Indeed, for such packets, links are so lossy that sending a single copy along a path has a high probability of being lost (and being retransmitted, which involves additional delays), especially when the path diameter increases, particularly since the path's Packet Error Rate (PER) increases exponentially with the path length. Note that the computation of diverse paths may also be used to load-balance traffic flows across diverse paths (not just for 1+1).

Current diverse path mechanisms rely on knowledge of the full network topology, for example, using a link-state database, computation devices configured with full topology information, etc. In the case of typical routing protocols (e.g., Distance Vector) in LLNs, however, the routing topology is generally not fully known, i.e., nodes have limited visibility within the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example directed acyclic graph (DAG) in the computer is network in FIG. 1.

DESCRIPTION OF EXAMPLE EMBODIMENTS

Overview

Figure 1:
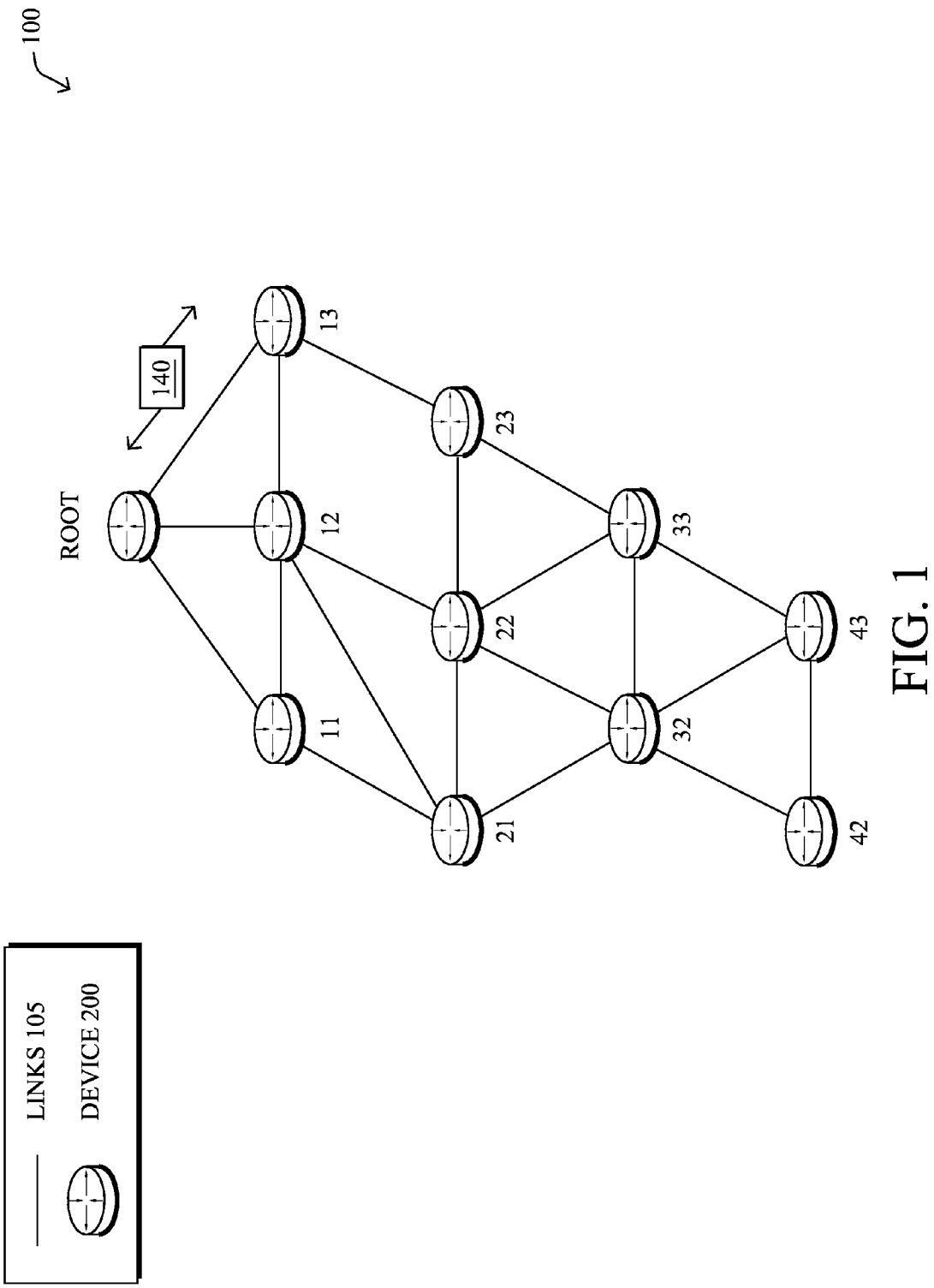
FIG. 1 illustrates an example computer network.

According to one or more embodiments of the disclosure, a source device detects a packet flow that meets criteria for multi-path forwarding, and forwards a probe packet on a primary path from the source device to a destination device, the probe packet carrying an indication to cause a plurality of transit devices along the primary path to add their respective local neighbor topology to the forwarded probe packet, and also to cause the destination device to compute a diverse path from the primary path based on the accumulated local neighbor topologies in the probe packet. Accordingly, the source device may receive a returned diverse path as computed by the destination device in response to the probe packet, and may thus forward the packet flow on the primary path and the diverse path from the source device to the destination device according to the multi-path forwarding.

According to one or more additional embodiments of the disclosure, a network device (e.g., transit device) determines its local neighbor topology, and in response to receiving a probe packet on a primary path from a source device to a destination device, the probe packet carrying an indication that requests diverse path computation by the destination device of the primary path, adds its local neighbor topology to an accumulation, within the probe packet, of respective local neighbor topologies of other transit devices along the primary path. The network (transit) device may then forward the probe packet with the accumulation of local neighbor topologies toward the destination device along the primary path.

According to one or more still additional embodiments of the disclosure, destination device receives a probe packet on a primary path from a source device, the probe packet carrying an indication that requests that the destination device compute a diverse path of the primary path for a packet flow. As such, the destination device may retrieve the primary path of the probe packet and, from the probe packet, an accumulation of respective local neighbor topologies of transit devices along the primary path. Based on the accumulation of local neighbor topologies in the probe packet, the destination device may then compute a diverse path from the primary path, and returns the computed diverse path to the source device.

Description

A computer network is a geographically distributed collection of nodes is interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 is illustratively comprising nodes/devices 200 (e.g., labeled as shown, "LBR," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
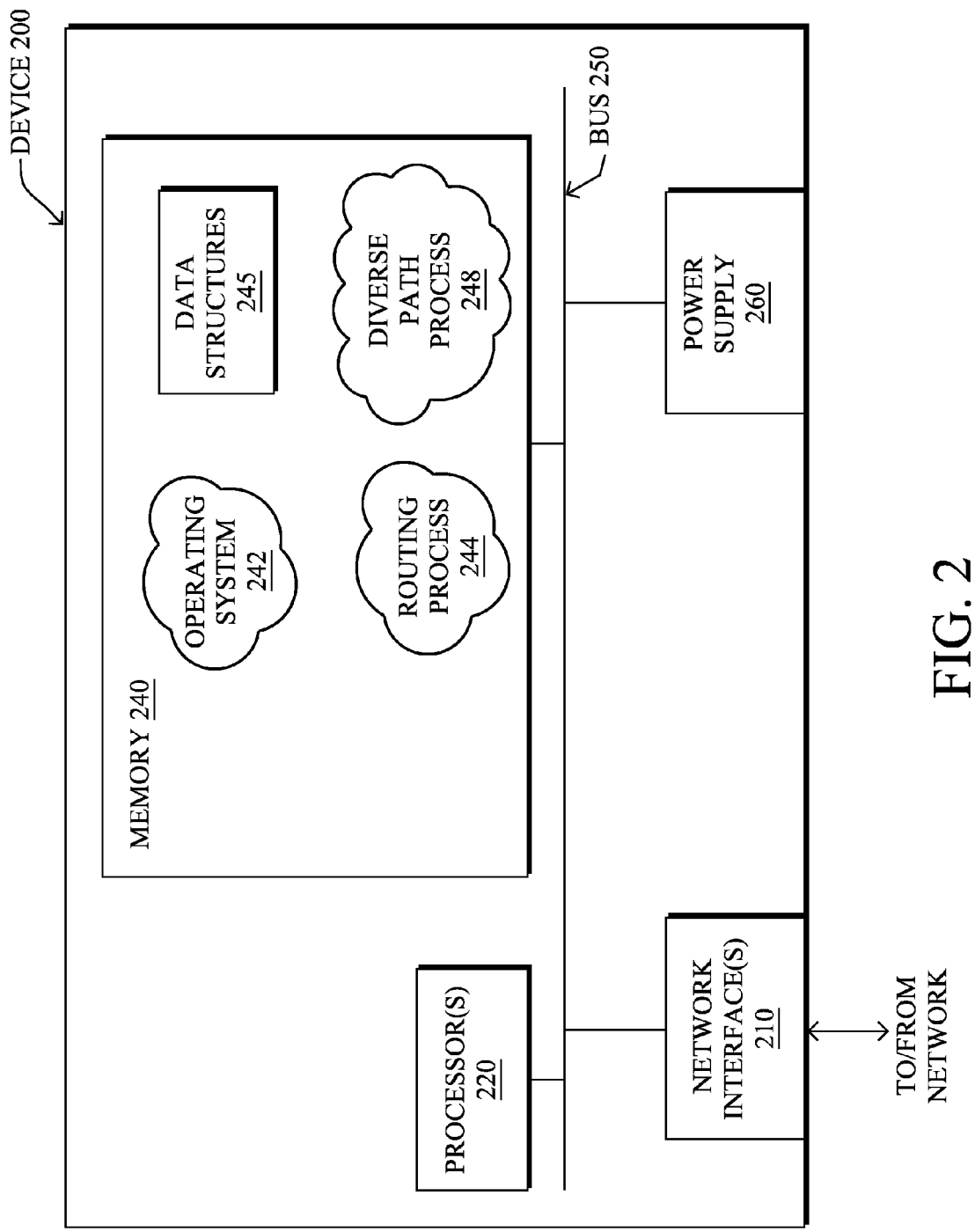
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In is some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative diverse path process 248, as described herein. Note that while diverse path process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such as at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process of routing process 244) based on an Objective Function (OF). The role of the Objective Function is generally to specify rules on how to build the DAG (e.g. number of parents, backup parents, etc.).

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as solid bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein. In addition, the creation of the DAG may also provide for one or more alternate parents (next-hops). Note that while a DAG 310 is shown, other distance vector routing topologies may be created, and a DAG, particularly one created using RPL, is merely one example of a routing protocol topology that may be created and utilized according to the techniques described herein.

As noted above, the computation of diverse paths is a well-known technical challenge in networks using distance vector routing protocols, such as many LLN routing protocols. The ability to build diverse paths is important for the Internet of Things (IoT) for a number of critical/real-time applications where multi-path forwarding techniques consisting of load-balancing traffic across diverse paths, or particularly duplicating critical packets and sending them along diverse paths, is a strong requirement. Indeed, for such packets, links are so lossy that sending a single copy along a path has a high probability of being lost (and being retransmitted, which involves additional delays), especially when the path diameter increases, particularly since the path's Packet Error is Rate (PER) increases exponentially with the path length.

Said differently, supporting multi-path forwarding, such as redundancy protection techniques, e.g., "1:1" protection (where the diverse path is used only in response to detecting a failure of the primary path) or "1+1" protection (where two diverse packets are sent, one on the primary path and one on the/each diverse path), is an important factor in many LLNs making use of Distance Vector routing protocols. For some applications in particular, the delivery of a critical packet is an absolute requirement. As one illustrative example (among many), Industrial Automation has specified several classes of traffic:

Class 0: Emergency action—always a critical function;
Class 1: Closed-loop regulatory control—often a critical function;
Class 2: Closed-loop supervisory control—usually a non-critical function;
Class 3: Open-loop control—operator takes action and controls the actuator (human in the loop);
Class 4: Alerting—Short-term operational effect (for example, event-based maintenance);
Class 5: Logging and downloading/uploading—No immediate operational consequence (e.g., history collection, sequence-of-events, preventive maintenance).

Current LLN solutions are typically provide adequate service for the monitoring classes 4 and 5, which have the lowest reliability and real-time requirements, and sometimes the non-critical portions of class 3. However, in order to provide reliable service for the higher classes of traffic, e.g., class 3 and above, redundancy protection techniques (using diverse paths) may be necessary in such networks.

As also noted above, current diverse path mechanisms rely on knowledge of the full network topology, for example, using a link-state database, computation devices configured with full topology information, etc. In the case of typical routing protocols (e.g., Distance Vector) in LLNs, however, the routing topology is generally not fully known, and redundancy protection techniques for limited visibility networks have generally been unavailable or inefficient.

On-Demand Diverse Path Computation

The techniques herein provision on-demand diverse paths between two arbitrary nodes in a limited visibility computer network (e.g., for a limited period of time). In particular, the techniques allow a source/sender node to dynamically activate multi-path forwarding (e.g., load-balancing and/or redundancy protection) for a flow along a primary path, and generally rely on a receiving/destination node of the primary path to compute the diverse path based on the gathering of topological information in a packet (e.g., a probe or a first packet of the flow) sent along the primary path from the source node.

Specifically, according to one or more embodiments of the disclosure as described in detail below, a source device detects a packet flow that meets criteria for multi-path forwarding, and forwards a probe packet on a primary path from the source device to a destination device, the probe packet carrying an indication. Based on this indication, transit devices along the primary path add their local neighbor topology to an accumulation, within the probe packet, of respective local neighbor topologies of other transit devices along the primary path. In addition, upon receiving the probe packet with the indication, the destination device computes a diverse path from the primary path based on the accumulated local neighbor topologies in the probe packet, and returns the diverse path to the source device. Accordingly, upon receiving the returned diverse path as computed by the destination device, the source device may thus forward the packet flow on the primary path and the diverse path from the source device to the destination device according to the multi-path forwarding.

Illustratively, the techniques described herein may be performed by hardware, software, and/or firmware, such as in accordance with the diverse path process 248, which may contain computer executable instructions executed by the processor 220 (or independent processor of interfaces 210) to perform functions relating to the techniques is described herein, e.g., in conjunction with routing process 244. For example, the techniques herein may be treated as extensions to conventional protocols, such as one or more illustrative routing protocols (e.g., RPL), and as such, may be processed by similar components understood in the art that execute those protocols, accordingly. It is worth noting that most, if not all, of the current routing protocols designed for LLNs or other types of limited visibility networks are distance vector, whether proactive or reactive, where it is often extremely challenging to provide diverse paths. The techniques herein may be applicable to all distance vector routing protocols designed for limited visibility networks (e.g., LLNs, IoT domains, etc.), and is not specifically limited to any of them.

Note also that functionality of the diverse path process 248 may be specifically configured for whether the device is a source (originator) node, an intermediate (transit) node, or a destination (receiver) node. However, in an illustrative embodiment, each node 200 may be generally capable of functioning as any type of node/device, that is, depending upon the traversed primary path in question.

Operationally, the first component of the illustrative techniques herein is to dynamically determine, by source devices (senders) of traffic, when to trigger multi-path (diverse path) forwarding, such as for redundancy protection for critical traffic, e.g., for either "1:1" protection, "1+1" protection, or load-balancing, optionally for a specific period of time. That is, in contrast with many current approaches, the source device, such as the root device or any other device 200 in the network 100, first determines "on-the-fly" whether or not a packet flow requires multi-path forwarding. By detecting whether a packet flow meets certain defined criteria for multi-path forwarding, the techniques herein may generally provide that the techniques be used for a limited subset of all traffic (e.g., to reduce overhead in the network). In particular, collecting neighborhood information as described below may be costly, thus the source may decide to limit the use of the techniques herein for very critical traffic, and also optionally for only those destination devices that are within a pre-defined distance.

This is, the decision to apply multi-path forwarding to particular traffic flows may is be driven by policy according to matching specific criteria, such as various rules defining particular flow characteristics, specific scenarios or circumstances, etc. For example a specific set of events may make a specific notification extremely important, e.g., alerts, potentially for a specific amount of time. Such criteria/rules may be obtained from a network management server (NMS) or other management device, such as during the bootstrapping process, and may be dynamically updated, such as due to varying network conditions or varying application determinations (e.g., an indication from higher layer that a critical packet flow may be experiencing a low packet delivery rate, etc.). Note that critical packet flows are frequent in the IoT, to send a set of critical event information, download an urgent security patch on a remote device, etc.

Illustratively, example criteria to be met for multi-path forwarding may comprise, among others, particular traffic types, priorities, or classes, particular applications sourcing the traffic, particular destination devices (such as an access control list (ACL)), destinations within a configured distance (e.g., more of a limiting criteria in addition to one or more other criteria), traffic during particular times, traffic during particular events, etc. In one specific embodiment, the criteria may even simply be to use the techniques herein for multi-path forwarding in response to a source device being configured to be able to generate critical packets, generally (e.g., a device whose sole purpose is to generate critical alarms).

Figure 4:
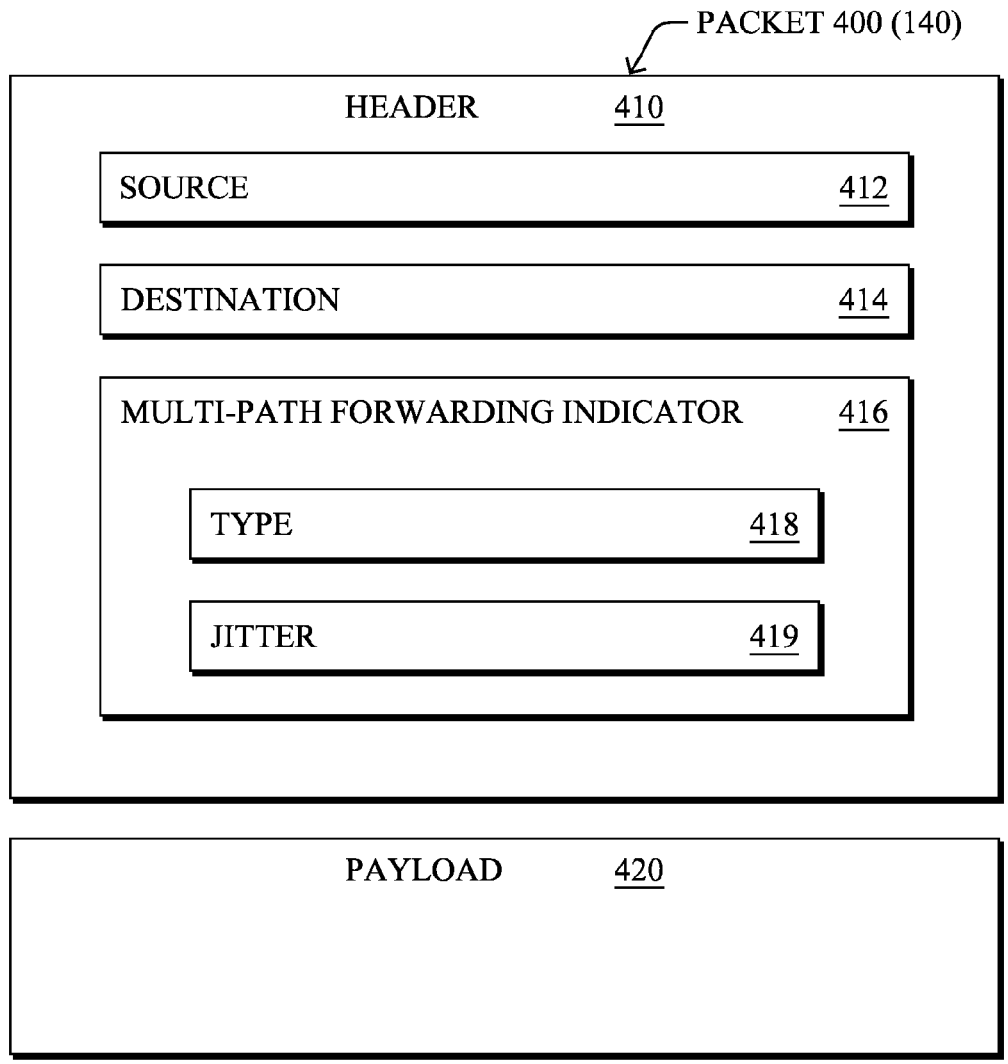
FIG. 4 illustrates an example packet format.

Once the source device determines that multi-path forwarding is required for a packet flow, it forwards a "probe packet" as described herein on a primary path to a corresponding destination device for the flow. For instance, FIG. 4 illustrates an example (and simplified) packet 400, that may generally comprise a header 410 used to forward the packet 400 (e.g., with source 412 and destination 414), and corresponding payload 420, as will be understood by those skilled in the art. Generally, the header 410 (e.g., an IPv6 Hop-by-Hop header) of the probe packet 400 carries a multi-path forwarding indicator 416 (indication 416, along with other fields 418 and 419, as described herein), such as a bit, flag, or TLV, that indicates to one or more transit devices along the primary path as well as the destination device of the path that the techniques herein for multi-path forwarding have been triggered for the corresponding (identified) packet flow, namely, is requesting diverse path computation by the destination device.

Figure 5:
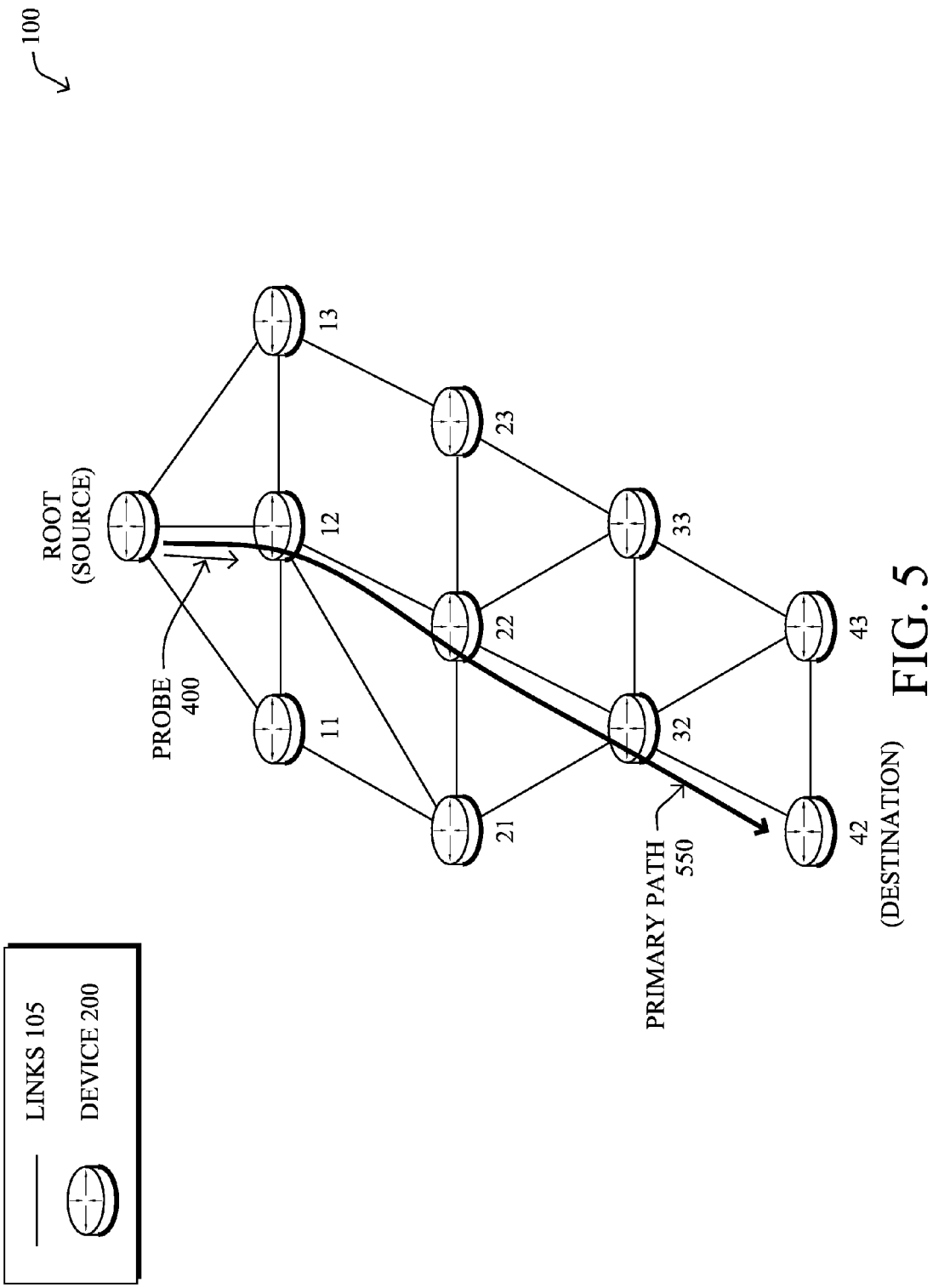
FIG. 5 illustrates an example primary path and probe message.

For instance, assume, as shown in FIG. 5, that a source device such as the root device (or any other arbitrary device) determines that a packet flow along primary path 550 is to receive multi-path forwarding. The illustrative primary path 550 may comprise Root-12-22-32-42, such that the root node is the source device, nodes 12, 22, and 32 are transit (or intermediate) devices, and node 42 is the destination device. The indication 416 sent within the probe packet 400 along the primary path 550 informs the visited nodes that the multi-path forwarding trigger has been applied to the corresponding flow, thus causing any transit device along the primary path to add their respective "local neighbor topology" to the forwarded probe packet 400.

Figure 6:
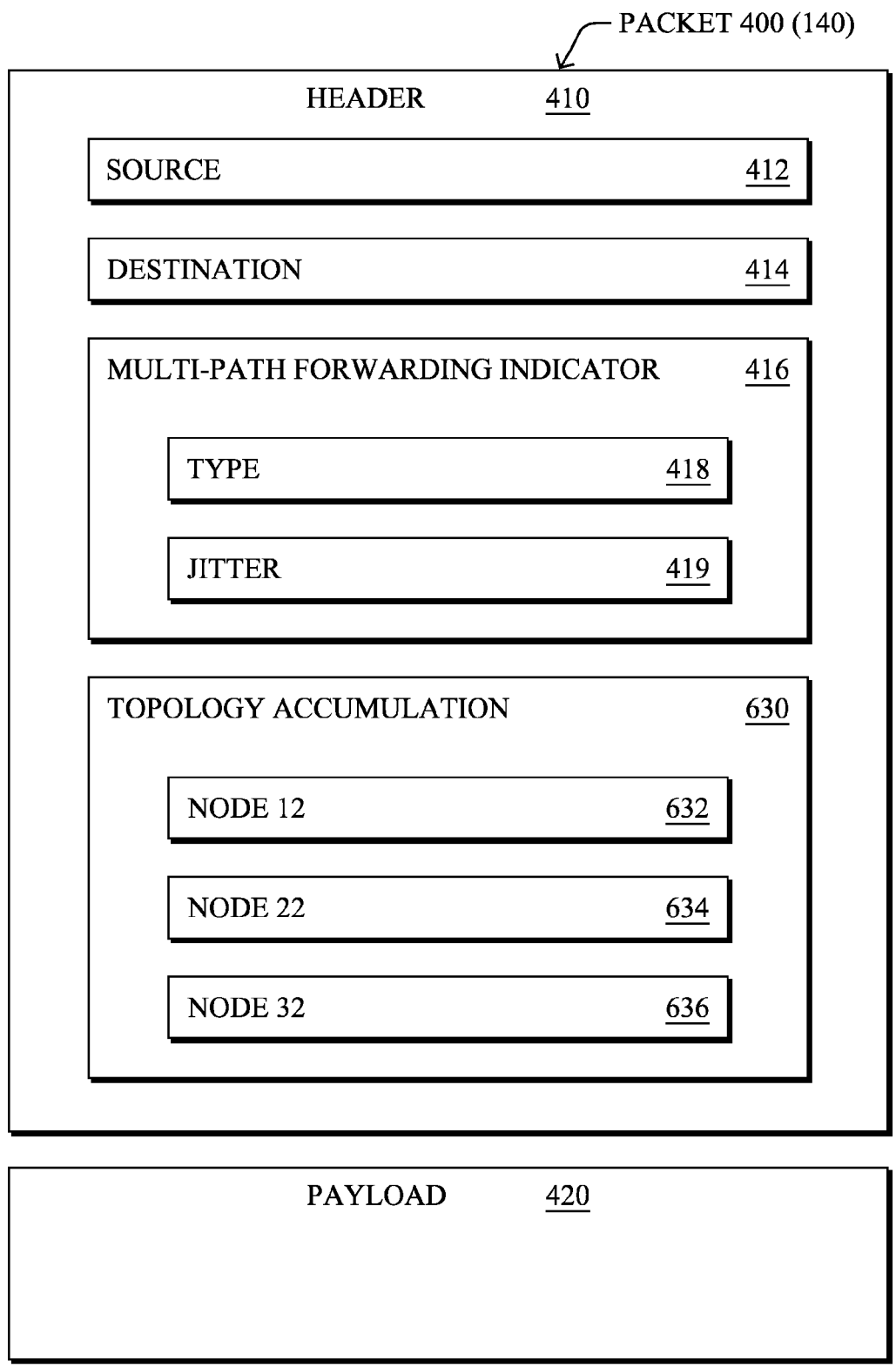
FIG. 6 illustrates another example packet format with accumulated local neighbor topologies.

In particular, in LLNs, and in any other type of network or routing protocol where the network topology is not generally fully known by the source nodes generating the traffic (e.g., distance vector routing protocols), diverse paths cannot be created by the source nodes without first gathering topology information. (Note that the techniques herein a agnostic of the routing protocol in use.) Accordingly, as shown in FIG. 6, for example, the techniques herein provide for a mechanism to accumulate localized topology information, where transit devices (e.g., nodes 12, 22, and 32) receiving a probe packet with the indication 416 may add their local neighbor topology to an accumulation 630, within the probe packet 400, of respective local neighbor topologies (added fields 632, 634, 636, etc., respectively) of other transit devices along the primary path 550.

Figure 7:
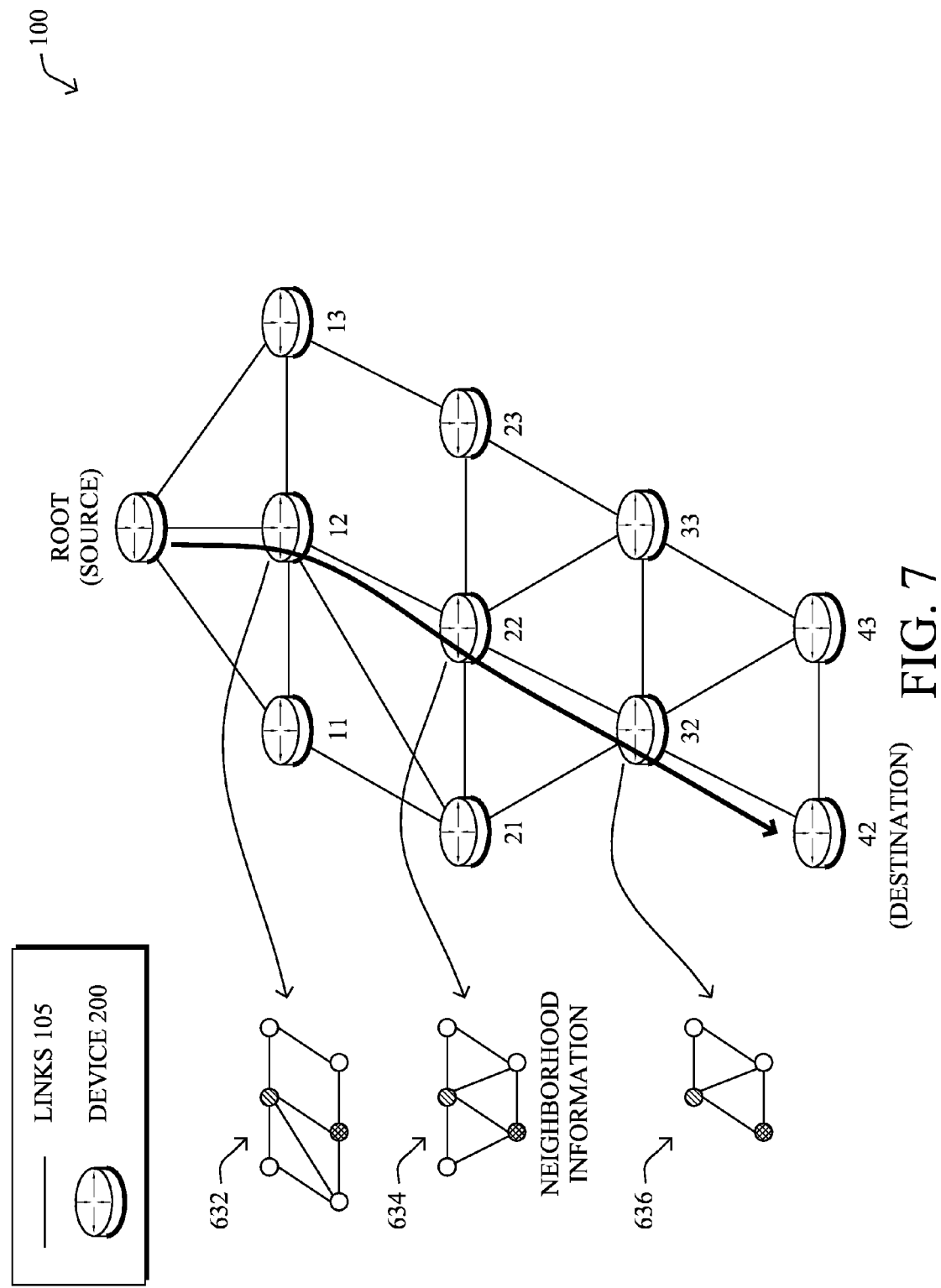
FIG. 7 illustrates an example of local neighbor topology accumulation along the primary path.

That is, with reference also to FIG. 7, when receiving a probe packet 400 on a primary path 550 that carries an indication 416 requesting diverse path computation by the destination device, each device/router visited processes the probe packet to add not only its own address, but also the list of its reachable neighbors 632/634/636. The corresponding local neighbor topology may be determined, for example, thanks to IPv6 neighbor discovery, and may generally include a listing of one or more reachable neighbor nodes, as well as, optionally, those reachable neighbors' neighbors, which may be obtained thanks to a local multicast message as will be appreciated by those skilled in the art. For example, as depicted in FIG. 7, node 12 may receive the probe packet 400, and inserts its local neighbor topology 632 into the packet, which may comprise neighbor nodes 11, 13, 21, 22, and 23, and their corresponding connectivity (links). Note that node 23 is not directly reachable by node 12, but is reachable by node 13 and node 22, and thus may be included. Illustratively, also, the neighbor topology may only comprise downstream nodes as shown, or may comprise any reachable neighbor, whether upstream or downstream. Similarly, node 22 may add topology 634 to the packet 400 that includes nodes 21, 23, 32 and 33, while node 32 may further add topology 636 including nodes 33, 42, and 43, each along with their corresponding connectivity.

In dense environments, a transit device/router may choose to select a subset of reachable neighbors for the correspondingly local neighbor topology. For example, to prune the list of included neighbors, a transit device may choose to only include neighbors that are reachable from the neighbors of the previous-hop and a next-hop from the transit device along the primary path, thus ensuring that the included neighbors can provide alternate routes from the previous hop. This in turns allows the destination device, responsible for the computation of a diverse path as described below, to discover a small but required subset of the topology for the required diverse paths in a distance vector proactive routing network. Furthermore, various compression techniques may be used for collecting the required "neighborhood" information 630, such as IP address compression, use of local labels or tags uniquely identify nodes in the network, etc.

The transit nodes forward the probe packet 400 with the accumulation of local neighbor topologies 630 toward the destination device along the primary path 550. Upon receiving the packet at the destination device (e.g., node 42), and upon detecting that the indication 416 is present that requests that the destination device compute a diverse path of the primary path for a packet flow, the destination device may thus attempt to compute a diverse path based on the accumulated local neighbor topologies in the probe packet. Note that the primary path may be computed according to the routing protocol, e.g., DAG 310 (though not limited to RPL), and the diverse path computation makes use of the local topology discovery, and is computed by the destination device, e.g., using a lightweight path computation algorithm.

Figure 8:
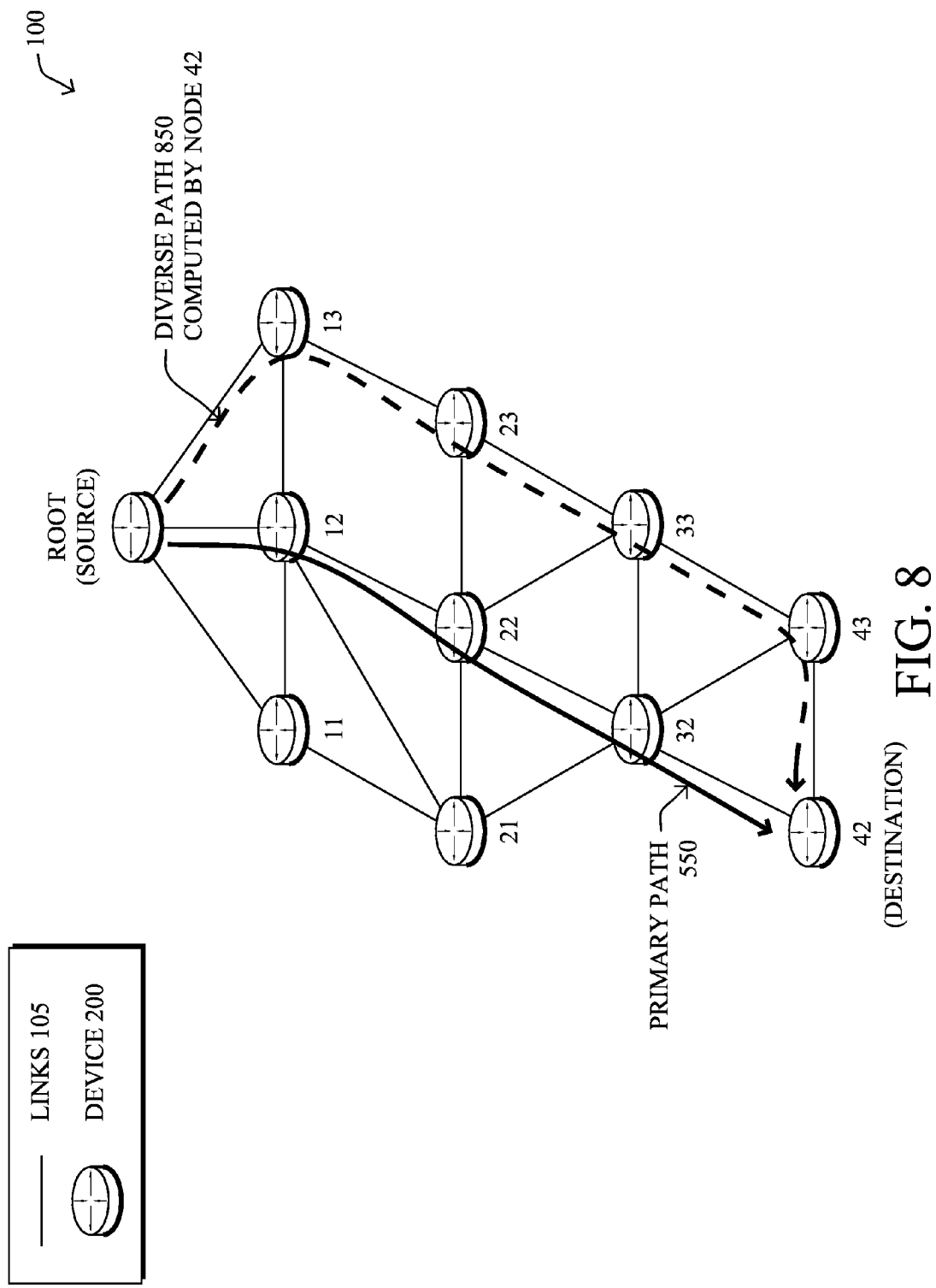
FIG. 8 illustrates an example of a diverse path computation.

Specifically, the receiving destination device retrieves the primary path 550 of the is probe packet (e.g., as recorded in the packet itself) as well as the accumulation 630 of respective local neighbor topologies of transit devices along the primary path. As shown in FIG. 8, by inspecting the primary path followed by the probe packet 400, and based on the accumulation of local neighbor topologies in the probe packet, the destination device may then compute a diverse path 850 (Root-13-23-33-43-42), e.g., after removing the set of traversed routers (transit devices).

Note that the algorithm chosen for diverse path computation could be as simple as the two-step approach (remove all traversed routers and compute a diverse path) or more sophisticated such as the known Bandhari algorithm. In general computing diverse paths can be complex, and in most cases is NP-Complete, however, in the embodiments herein, this is not the case because the primary path 550 follows the path computed by the routing protocol (e.g., according to the objective function), regardless of the specific routing protocol. So the only computation task for which the destination router need be responsible is to avoid the set of traversed links/routers to compute the diverse path 850 thanks to the neighborhood information accumulated by the probe packet, which is a relatively simple and minimally intensive task.

In accordance with one or more specific embodiments, if more granularity is required, a second bit/indicator called "type" 418 in FIG. 4 above is defined that specifies whether the diverse path should be computed as a link-diverse path or a node-diverse (i.e., link+node-diverse) path. In the later case, if no node-diverse paths can be found by the destination device, a fall-back option may be to compute a link-diverse path (and optionally record that fact in the reply to the source device).

Figure 9:
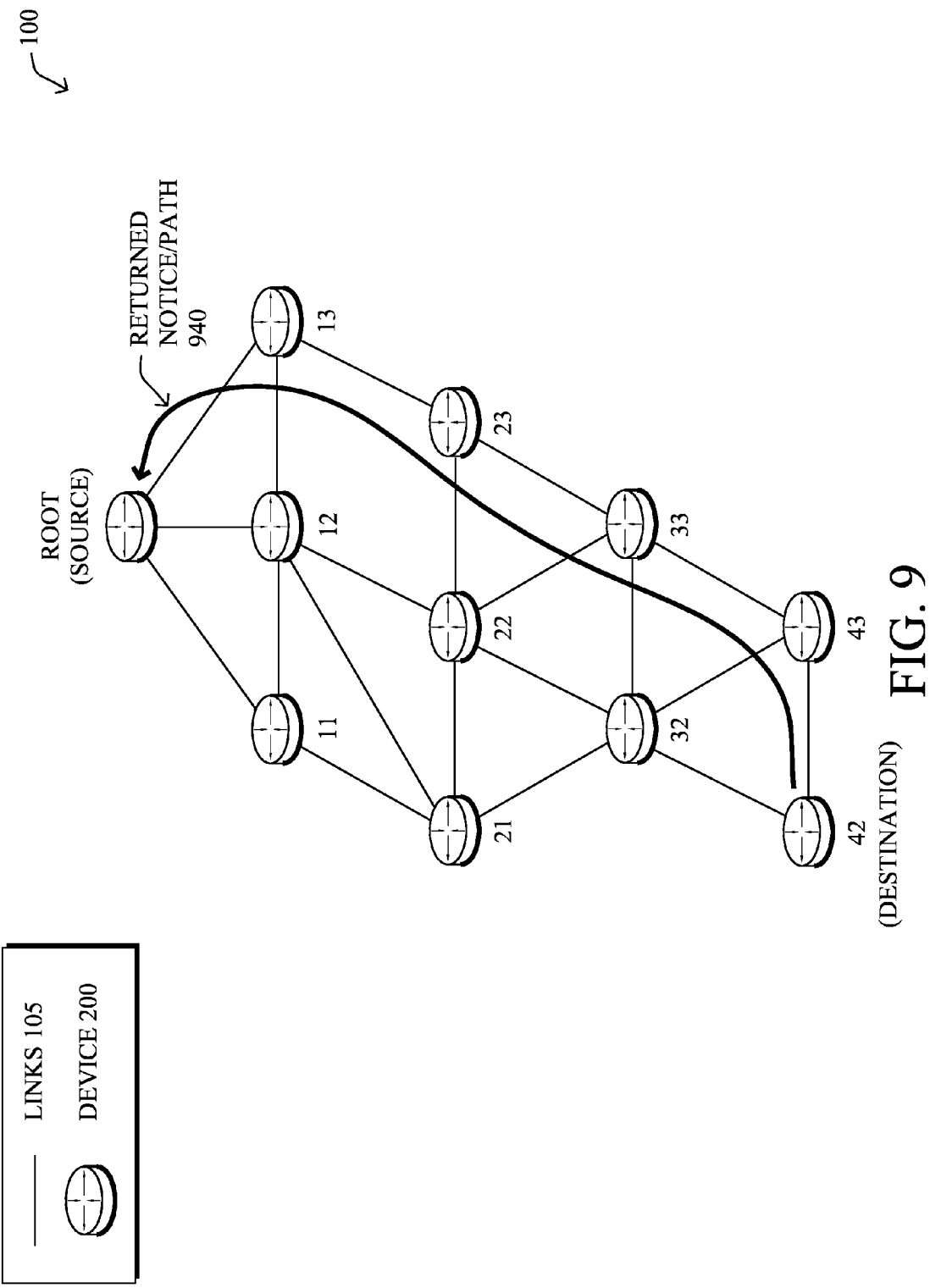
FIG. 9 illustrates an example notification exchange.

As shown in FIG. 9, once the diverse path has been computed, the destination device may return the computed diverse path back to the source device in a message 940, such as a newly defined IPv6 unicast message (e.g., on the primary path, the diverse path, or any other path back to the source device). Upon receiving such a message 940, the source device may install the diverse path 850 in its routing table (a data structure 245), and activates the multi-path forwarding (e.g., 1+1, load-balancing, etc.), thus forwarding is the packet flow on the primary path 550 and the diverse path 850 from the source device (e.g., the root node) to the destination device (e.g., node 42) according to the multi-path forwarding. For example, for 1+1 protection, duplicated packets may be marked with an appropriate "duplicated packet" flag (by the source device or the application originating the flow) along both paths. The destination device may then correspondingly receive the packet flow on the primary path and the diverse path from the source device, and processes the received packet flow according to the chosen multi-path forwarding mechanism (e.g., load-balancing, redundancy protection such as 1+1 or 1:1, etc.).

Notably, in one embodiment, the probe packet 400 may be an initial (first) packet of the actual packet flow, where the indication 416 (and added information 630) is inserted within the packet header 410 of the original packet, that is, where the payload 420 corresponds to that of the packet flow. In this instance, the destination device may cache the first packet for redundancy processing of the copy to be received later over the computed diverse path, and uses the "piggybacked" local neighbor topology information 630 to compute the diverse path. (Note that for this particular embodiment, the indication 416 may be the "duplicated packet" flag as mentioned above.) Alternatively, in yet another embodiment, the probe packet 400 is an explicit probe packet that may be sent with the indication 416 prior to an initial packet of the packet flow, such that the gathered neighborhood information 630 may be within header 410, or else may be part of the payload 420 of the packet, accordingly. (Note that still further, a two-step probe process may be executed in a specific embodiment, where a first probe indicates the multi-path forwarding, and a second probe then later gathers neighborhood information, such as after having given the transit nodes time to collect such information.) That is, when an explicit probe packet is utilized, upon detecting a packet flow to which multi-path forwarding is to be applied, the source device may first send out the probe packet to generate the diverse path, and then begins to forward the packet flow, e.g., over both paths.

Figure 10A:
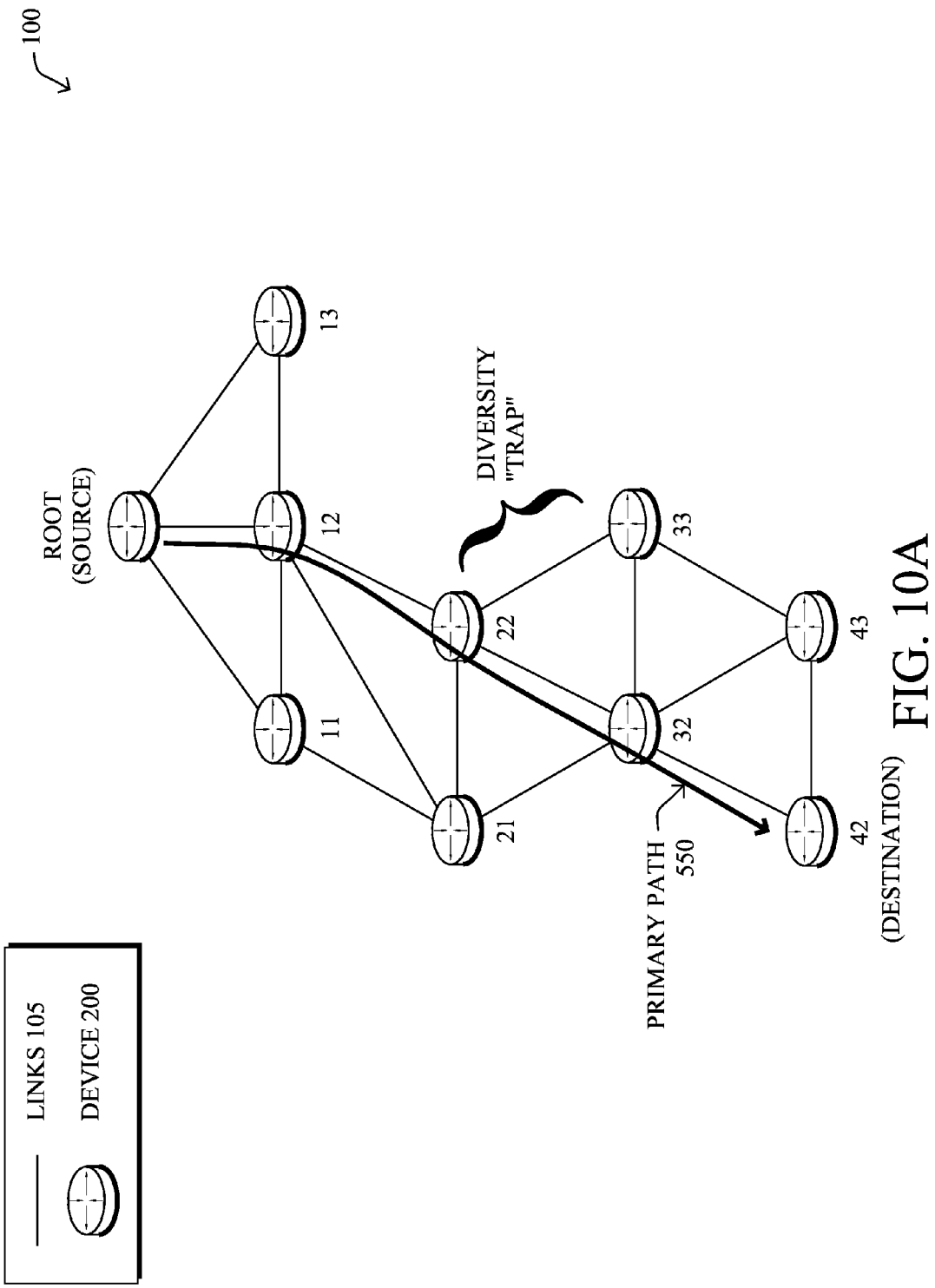
FIGS. 10A-10C illustrate an example of diverse path trap management.

There are circumstances where no diverse paths are available, or, in fact, where finding diverse paths is not possible even where diverse paths exist, but would not be is found because of the computation of the diverse path after having already selected the first path according to the routing protocol in use. As shown in FIG. 10A, for example, this condition is referred to as the diversity "trap" problem, such as where if node 23 were removed from the topology, the original primary path 550, by utilizing nodes 22 and 32, removes any possibility of a node-diverse path. Note that though this is very unlikely in LLNs (or other types of networks) where the network density is high, it may be acceptable in certain situations to not have a diverse path since being always capable of finding diverse paths is NP-Complete and may require knowing the entire topology database, which is not a viable/scalable solution for computing diverse paths between an arbitrary pair of nodes in distance vector routing environment.

Figure 10B:
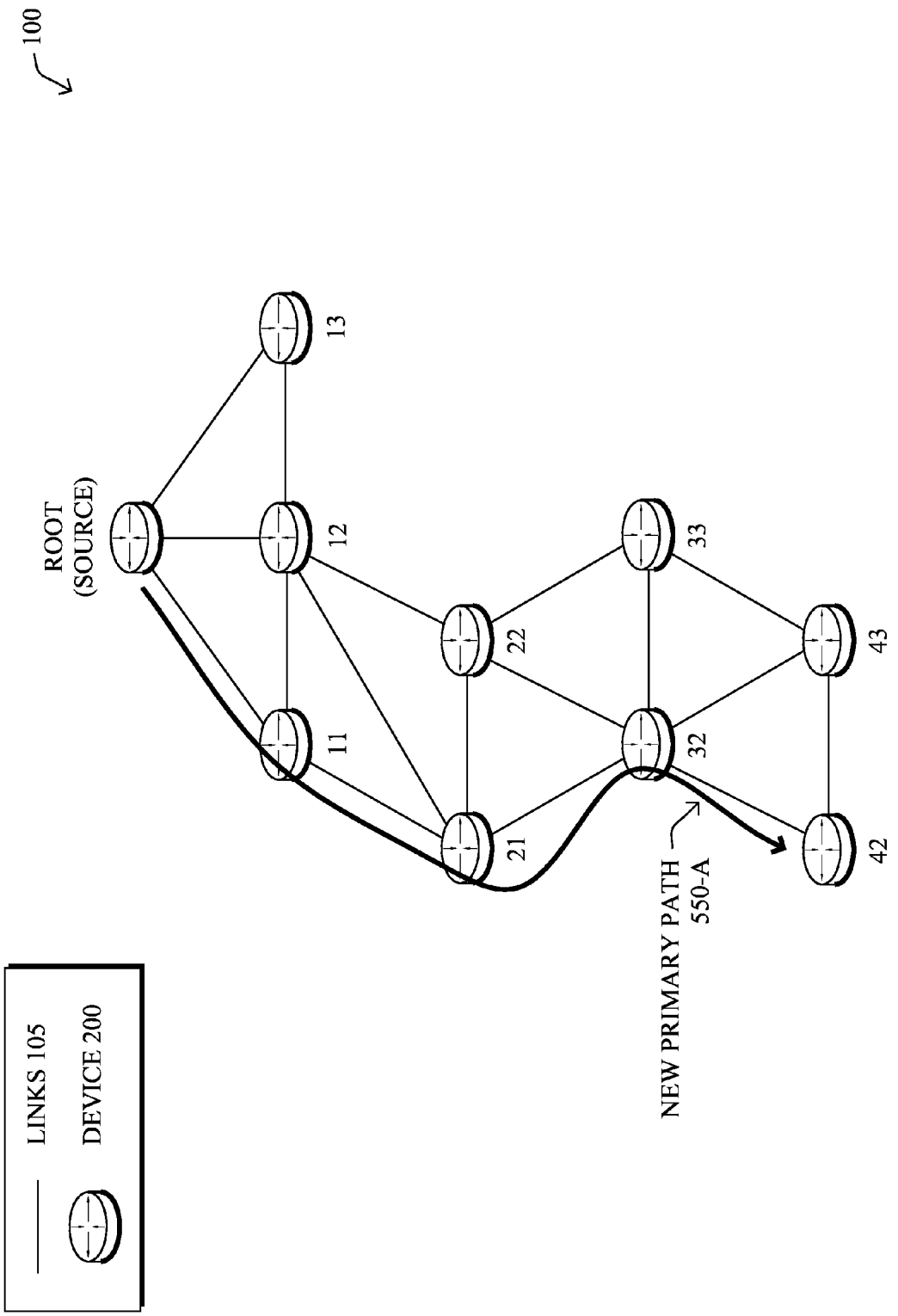
Figure 10C:
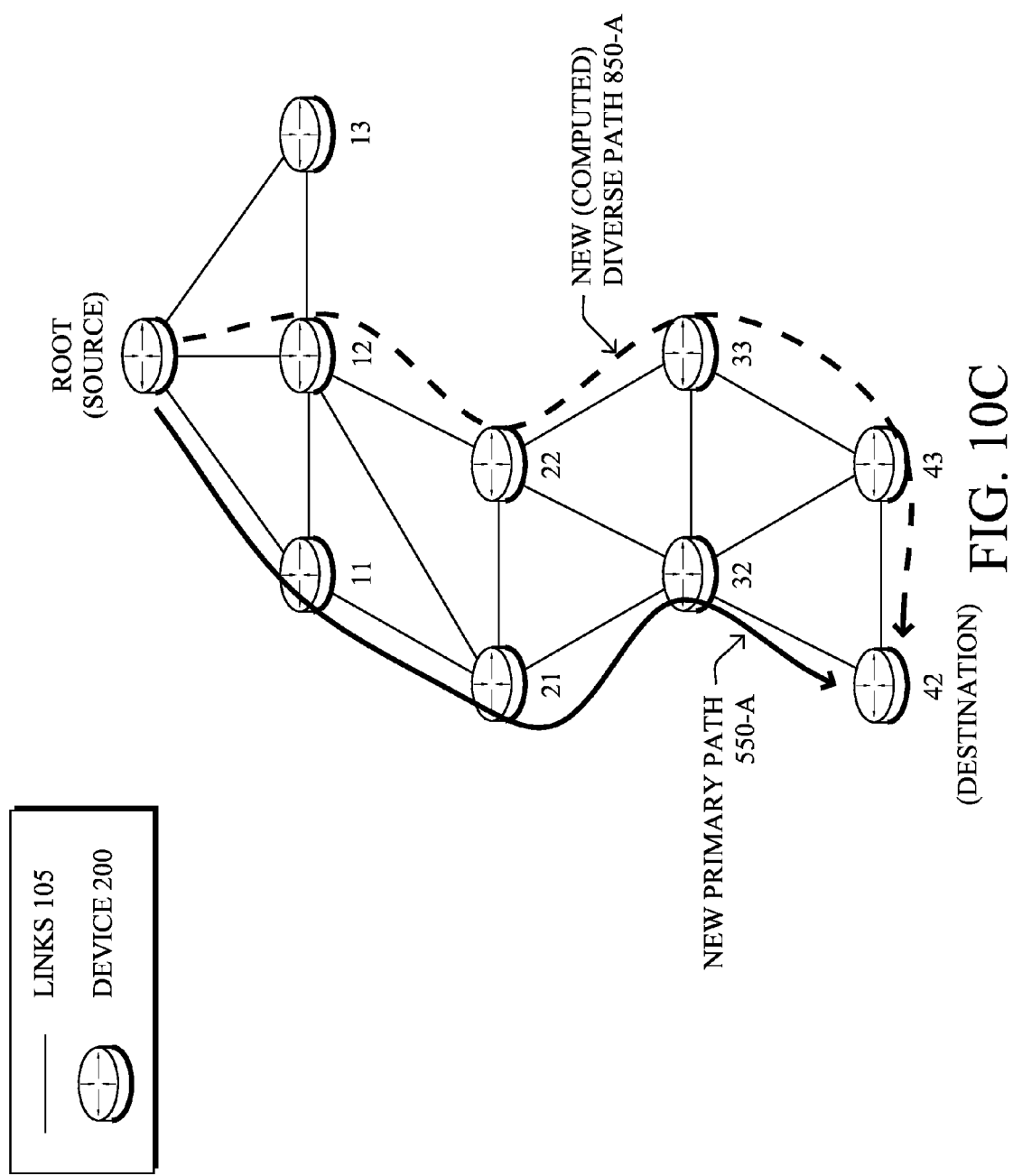

According to one or more embodiments herein, in the event that no diverse path can be found by the destination device, a notice 940 may be returned to the source device indicating that no diverse path could be computed (e.g., a newly specified flag may be set that reports such network condition). The source device (or destination device) may, in turn, notify the issue to a management device (e.g., an NMS, a central intelligence controller or "CIC," etc.). In addition, or alternatively, the source device may also modify the primary path 550 so as to increase the chance for the destination device to find a diverse path. For example, as shown in FIG. 10B, the source device may compute a new primary path 550-A to the destination device (e.g., Root-11-21-32-42), and may thus forwarding a new probe packet 400 on the new primary path 550-A to request re-computation of a diverse path based on the new primary path and associated local neighbor topologies 630 accumulated in the new probe packet. Upon receiving such a new probe packet 400 on a new primary path 550-A, as shown in FIG. 10C, the destination device may then attempt again to compute a diverse path 850-A (e.g., Root-12-23-33-43-42) based on a new accumulation of local neighbor topologies in the new probe packet, accordingly.

In another embodiment, the techniques herein may be additionally configured to absorb the jitter due to the additional delay for the duplicated packet flow, particularly where the initial packet of the flow is used as the probe packet 400 where there is an additional delay before the second packet is sent along the diverse path. Such a is functionality may be used in networks, for example, where both copies of the same packet are used for "single-ended protection" or on-the-fly packet reconstruction. Single-ended protection allows the destination of a packet to dynamically select which one of the two received packets should be consumed and is potentially less altered by error (which can be determined using a number of well-known error code detection mechanisms). That is, single-ended protection requires the reception of both packets at substantially the same time. In the later case, some techniques are sometimes used so as to reconstruct a packet from two altered copies of the same packet, which also requires receiving both copies of the packet at the same time to avoid buffering issues.

Where applications may require systematically receiving both copies of the same packet at substantially the same time (for example for error detection and correction), then it may be beneficial to bound the jitter between copies of the same packet (e.g., including the initial packet). As such, the probe packet may further carry a jitter-based indication 419 to cause the destination device to configure itself to wait a configured time after receiving a particular packet for the packet flow (on either the primary path or the diverse path) for a copy of a that packet (on either the opposing diverse path or the primary path, respectively). For example, a newly defined IPv6 header bit 419, e.g., called the NJ (No Jitter) bit, may be set, such that if the NJ bit is set, upon receiving the first copy of the packet, the destination device caches the first packet for a configurable period of time. If the second copy of the packet is received before the expiration of the timer, both copies are simultaneously delivered to the ultimate receiver (e.g., an end-user device or application in communication with the destination device), otherwise the first packet is delivered without further delay. Note that in yet another embodiment, the timer can be dynamically computed by the destination device according to historical data, recorded path length, etc.

Figure 11:
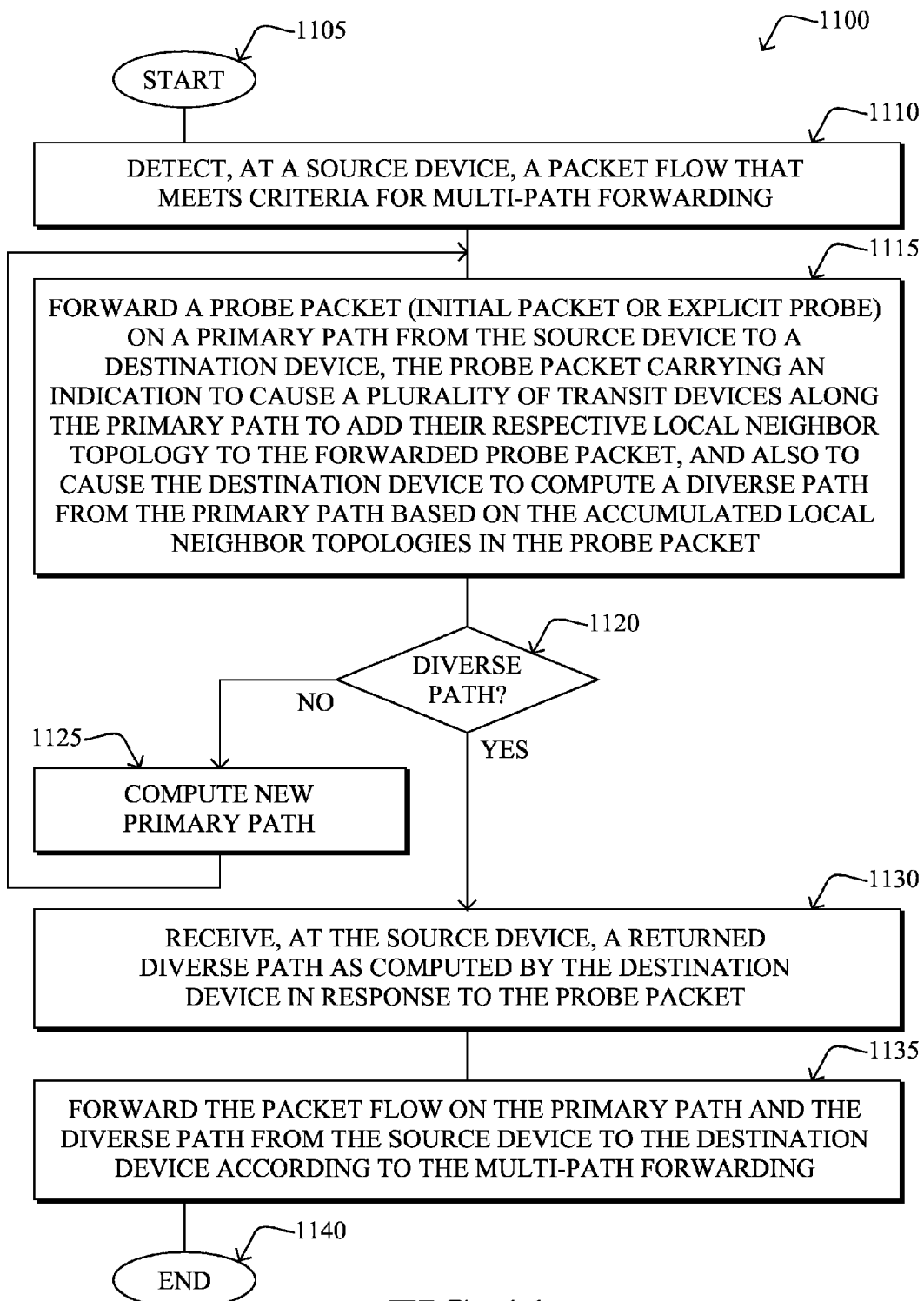
FIG. 11 illustrates an example simplified procedure for on-demand diverse path computation for limited visibility computer networks, particularly from the perspective of the source device.

FIG. 11 illustrates an example simplified procedure for on-demand diverse path computation for limited visibility computer networks in accordance with one or more embodiments described herein, particularly from the perspective of the source device. The procedure 1100 may start at step 1105, and continues to step 1110, where, as described in greater detail above, a source device (e.g., the root as shown above, or any is other node within the network 100) may detect a packet flow that meets one or more criteria for multi-path forwarding, such as a type, priority, etc. In response, in step 1115, the source device forwards a probe packet 400 (e.g., an initial packet of the flow or an explicit probe) on a primary path 550 from the source device to a destination device (e.g., node 42). Specifically, as described herein, the probe packet 400 carries an indication 416 to cause a plurality of transit devices along the primary path (e.g., nodes 12, 22, 32) to add their respective local neighbor topology to the forwarded probe packet (into field 630). In addition, the indication 416 also causes the destination device to compute a diverse path 850 from the primary path based on the accumulated local neighbor topologies in the probe packet.

If there is no diverse path computed in step 1120, then in step 1125 the source device may receive the corresponding notification from the destination device, and in step 1125 may compute a new primary path 550-A, and returns to 1115 to attempt to find a new (existing) diverse path 850-A, accordingly. However, if there is a diverse path computed in step 1120, then in step 1130 the source device receives the returned diverse path 850 as computed by the destination device in response to the probe packet. The source device may then forward the packet flow on the primary path 550 and the diverse path 850 from the source device to the destination device according to the multi-path forwarding in step 1135. Notably, this example may illustrate either load-balancing or 1+1 redundancy protection as the multi-path forwarding technique in step 1135 (using both paths at once), though the diverse paths may also be used for 1:1 protection, where the diverse path (and hence step 1135) utilizes the diverse path 850 only in response to detecting a failure of the primary path 550. The procedure 1100 illustratively ends in step 1140.

Figure 12:
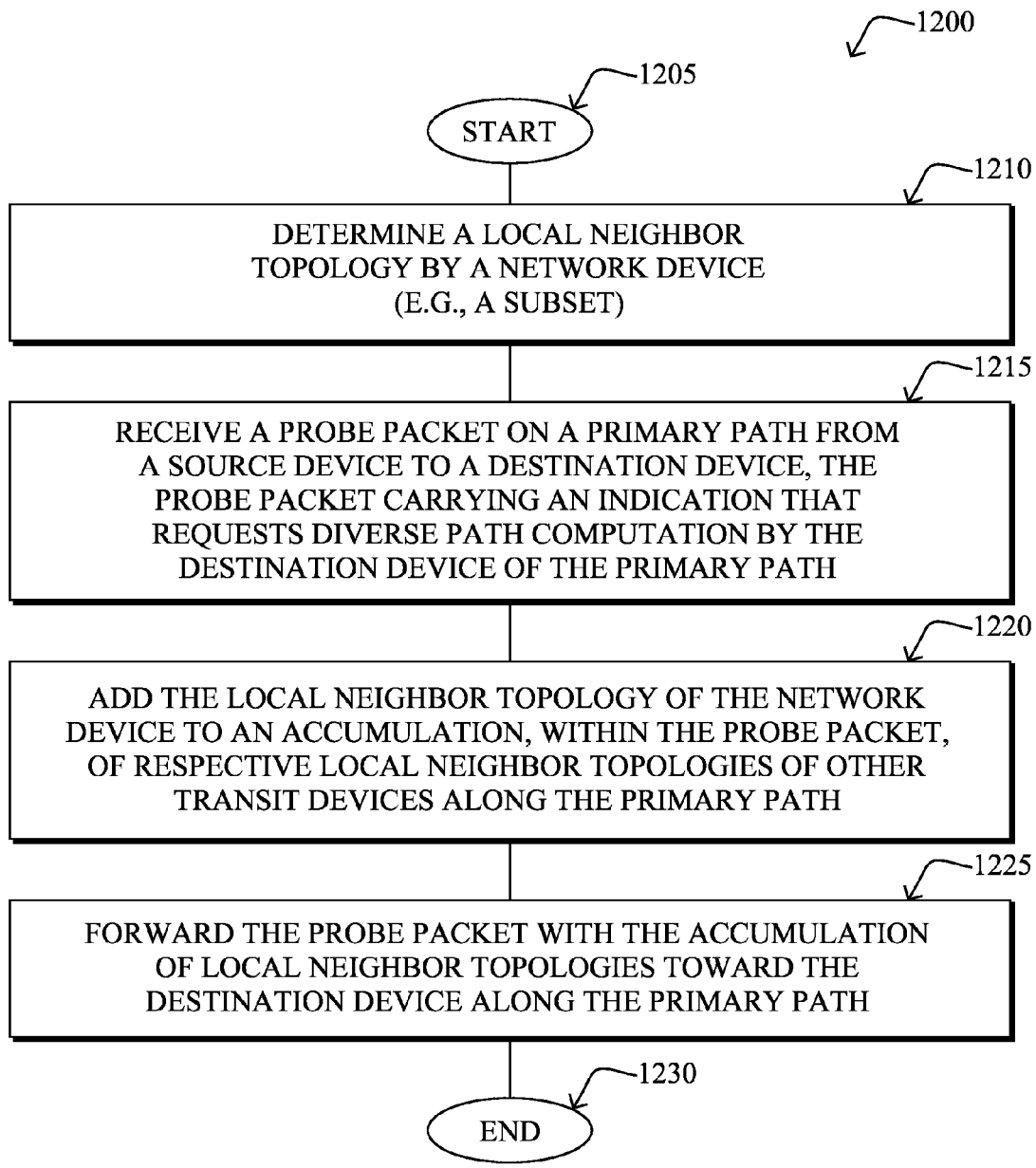
FIG. 12 illustrates an example simplified procedure for on-demand diverse path computation for limited visibility computer networks, particularly from the perspective of the transit device.

In addition, FIG. 12 illustrates an example simplified procedure for on-demand diverse path computation for limited visibility computer networks in accordance with one or more embodiments described herein, particularly from the perspective of the transit device. The procedure 1200 may start at step 1205, and continues to step 1210, where, as described in greater detail above, a network device (transit device, e.g., node 22) determines its local neighbor topology, such as a subset according to one or more of the is embodiments described above. When receiving a packet in step 1215 on a primary path 550 from a source device to a destination device (e.g., from the root to node 42), the transit device may determine whether it is a probe packet carrying an indication that requests diverse path computation by the destination device of the primary path. If so, then in step 1220 the transit device adds its local neighbor topology to an accumulation, within the probe packet, of respective local neighbor topologies 630 of other transit devices along the primary path. Once processed, in step 1225, the transit device may forward the probe packet 400 with the accumulation of local neighbor topologies (field 630) toward the destination device along the primary path, and the procedure may then end in step 1130.

Figure 13:
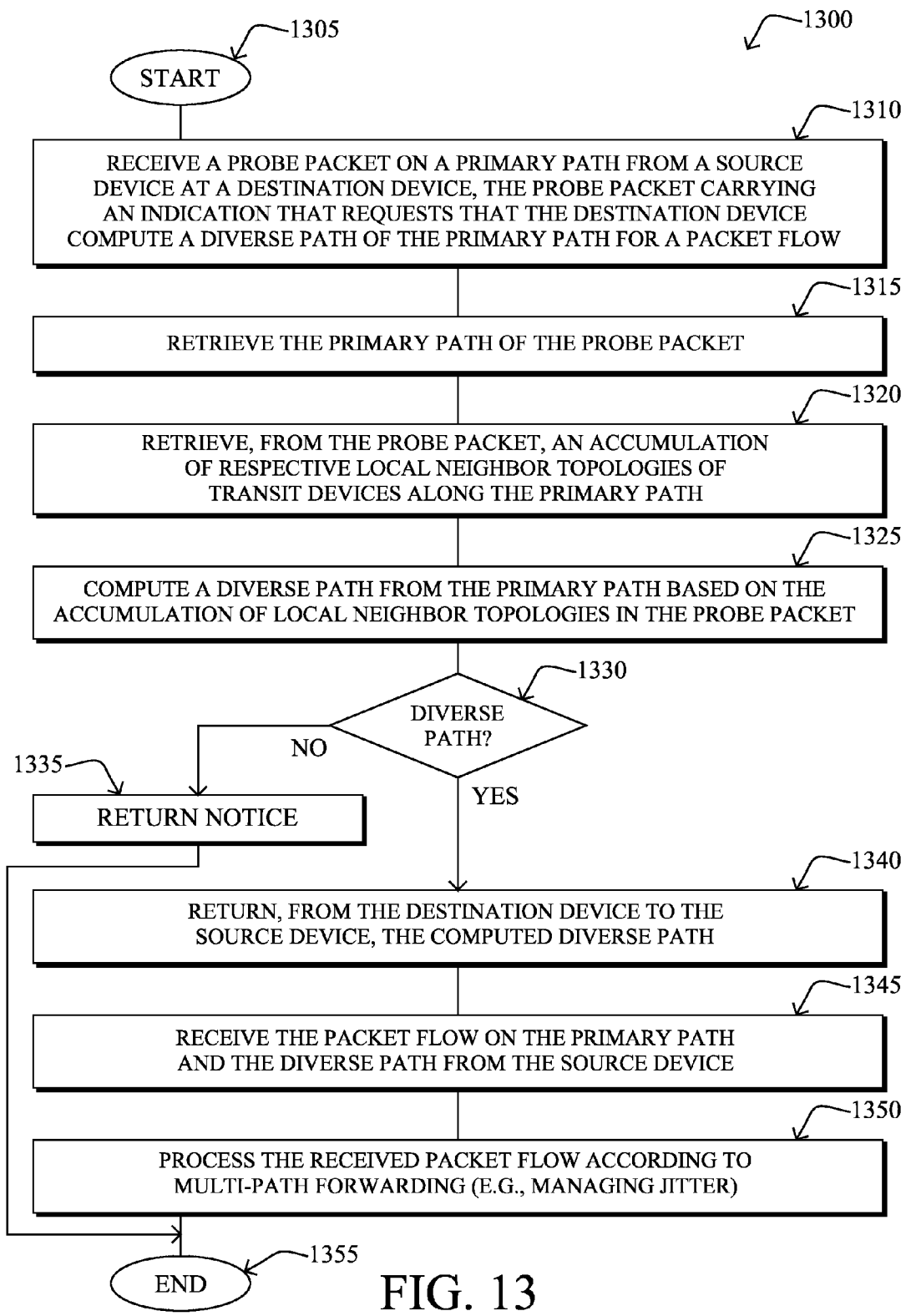
FIG. 13 illustrates an example simplified procedure for on-demand diverse path computation for limited visibility computer networks, particularly from the perspective of the destination device.

Lastly, FIG. 13 illustrates an example simplified procedure for on-demand diverse path computation for limited visibility computer networks in accordance with one or more embodiments described herein, particularly from the perspective of the destination device. The procedure 1300 may start at step 1305, and continues to step 1310, where, as described in greater detail above, a destination device (e.g., node 42) may receive a probe packet 400 on a primary path 550 from a source device (e.g., root node), where as noted, the probe packet carries an indication 416 that requests that the destination device compute a diverse path of the primary path for a packet flow. In response, in step 1315, the destination device may retrieve the primary path of the probe packet (e.g., from the packet itself), and also retrieves, from the probe packet in step 1320, an accumulation of respective local neighbor topologies 630 of transit devices along the primary path. As such, in step 1325 the destination device may compute a diverse path 850 from the primary path 550 based on the accumulation of local neighbor topologies in the probe packet.

Note that if there is no diverse path that may be computed in step 1330, then in step 1335 the destination device may return a notice 940 to the source device of the computational failure, and the procedure ends (albeit, generally awaiting a new probe on new primary path 550-A, as noted above).

If there is a diverse path 850 in step 1330, however, then in step 1340 the destination device returns the computed diverse path in notice 940, and may then begin is receiving the packet flow on the primary path 550 and the diverse path 850 from the source device in step 1345. As such, in step 1350, the destination device may process the received packet flow according to multi-path forwarding as described in detail above, such as handling duplicate packets (e.g., while managing jitter), etc. The procedure 1300 illustratively ends in step 1355.

It should be noted that while certain steps within procedures 1100-1300 may be optional as described above, the steps shown in FIGS. 11-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1300 are described separately, certain steps from each procedure may be incorporated into each other procedure, and the procedures are not meant to be mutually exclusive.

The techniques described herein, therefore, provide for on-demand diverse path computation for limited visibility computer networks. In particular, the techniques herein provide an efficient 1+1 (or 1:1) protection mechanism for distance vector routing, as well as a load-balancing mechanism, particularly for LLNs or other networks with limited visibility, without requiring off-line computation, and regardless of the routing protocol in use. As such, the techniques increase the reliability for critical packets in limited visibility networks, and are particularly suited for constrained networks.

While there have been shown and described illustrative embodiments that provide for on-demand diverse path computation for limited visibility computer networks, it is to be understood that various other adaptations and modifications may be made within the spirit and scope of the embodiments herein. For example, the embodiments have been shown and described herein with relation to LLNs and in particular the RPL protocol. However, the embodiments in their broader sense are not as limited, and may, in fact, be used with other types of limited visibility networks and/or protocols, distance vector or not. Also, while the diverse paths are computed to a single destination device, in networks with point-to-multipoint (P2MP) traffic, a plurality of destination devices may is each compute a corresponding diverse path (e.g., just as though it were a single point-to-point or "P2P" path from the source to that destination).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, at a source device, a packet flow that meets criteria for multi-path forwarding;
   inserting a probe packet into a header of the packet flow;
   forwarding the packet flow on a primary path from the source device to a destination device, the probe packet carrying a multi-path forwarding indicator and a topology accumulation indicator to cause a plurality of transit devices along the primary path to add their respective local neighbor topology to the forwarded probe packet, and also to cause the destination device to compute a diverse path from the primary path based on the accumulated local neighbor topologies in the probe packet, wherein the probe packet is an initial packet of the packet flow;
   receiving, at the source device, a returned diverse path as computed by the destination device in response to the probe packet; and
   forwarding the packet flow on the primary path and the diverse path from the source device to the destination device according to the multi-path forwarding.

2. The method as in claim 1, wherein the criteria to be met for multi-path forwarding comprises one or more criteria selected from a group consisting of: one or more particular traffic types; one or more particular traffic priorities; one or more particular traffic classes; one or more particular applications sourcing the traffic; one or more particular destinations; a destination within a configured distance; traffic during one or more particular times; and traffic during one or more particular events.

3. The method as in claim 1, wherein the diverse path is selected from a link-diverse path and a node-diverse path.

4. The method as in claim 3, wherein the indication specifically requests one of either a link-diverse path and a node-diverse path.

5. The method as in claim 1, further comprising:
   receiving a notice at the source device from the destination device that no diverse path could be computed; and, in response,
   computing a new primary path to the destination device; and
   forwarding a new probe packet on the new primary path to request re-computation of a diverse path based on the new primary path and associated local neighbor topologies accumulated in the new probe packet.

6. The method as in claim 1, wherein the probe packet further carries a jitter-based indication to cause the destination device to wait a configured time after receiving a first packet for the packet flow on either the primary path or the diverse path for a copy of a the first packet on either the diverse path or the primary path, respectively, prior to processing the first packet.

7. A method, comprising:
   determining a local neighbor topology by a network device;
   receiving a probe packet from a packet flow on a primary path from a source device to a destination device, the probe packet carrying an indication that requests diverse path computation by the destination device of the primary path, wherein the probe packet is an initial packet of the packet flow;
   in response to the indication, adding the local neighbor topology of the network device to an accumulation, within the probe packet, of respective local neighbor topologies of other transit devices along the primary path; and
   forwarding the probe packet with the accumulation of local neighbor topologies toward the destination device along the primary path.

8. The method as in claim 7, wherein the local neighbor topology of the network device comprises a subset of reachable neighbors of the network device.

9. The method as in claim 8, wherein the subset of reachable neighbors comprises a set of one or more neighbors reachable from neighbors of a previous-hop and a next-hop from the network device along the primary path.

10. A method, comprising:
    receiving a probe packet from a packet flow on a primary path from a source device at a destination device, the probe packet carrying an indication that requests that the destination device compute a diverse path of the primary path for the packet flow, wherein the probe packet is an initial packet of the packet flow;
    retrieving the primary path of the probe packet;
    retrieving, from the probe packet, an accumulation of respective local neighbor topologies of transit devices along the primary path;
    computing a diverse path from the primary path based on the accumulation of local neighbor topologies in the probe packet; and
    returning, from the destination device to the source device, the computed diverse path.

11. The method as in claim 10, further comprising:
    receiving the packet flow on the primary path and the diverse path from the source device; and
    processing the received packet flow according to multi-path forwarding.

12. The method as in claim 10, wherein the diverse path is selected from a link-diverse path and a node-diverse path.

13. The method as in claim 12, wherein the indication specifically requests one of either a link-diverse path and a node-diverse path.

14. The method as in claim 10, further comprising:
    determining that no diverse path could be computed;
    returning a notice to the source device from the destination device that no diverse path could be computed;
    receiving a new probe packet on a new primary path; and
    computing a diverse path from the new primary path based on a new accumulation of local neighbor topologies in the new probe packet.

15. The method as in claim 10, wherein the probe packet further carries a jitter-based indication, the method further comprising:
    configuring the destination device to wait a configured time after receiving a first packet for the packet flow on either the primary path or the diverse path for a copy of a the first packet on either the diverse path or the primary path, respectively;
    in response receiving the copy of the first packet, processing the first packet and the copy of the first packet at substantially the same time; and
    in response to not receiving the copy of the first packet within the configured time, processing the first packet.

16. An apparatus, comprising:
one or more network interfaces to communicate in a computer network; a processor coupled to the network interfaces and adapted to execute one or more processes; and
a memory configured to store a process executable by the processor, the process when executed operable to:
detect a packet flow that meets criteria for multi-path forwarding for which the apparatus is a source device;
insert a probe packet into a header of the packet flow;
forward the packet flow on a primary path from the source device to a destination device, the probe packet carrying a multi-path forwarding indicator and a topology accumulation indicator to cause a plurality of transit devices along the primary path to add their respective local neighbor topology to the forwarded probe packet, and also to cause the destination device to compute a diverse path from the primary path based on the accumulated local 14 neighbor topologies in the probe packet, wherein the probe packet is an initial packet of the packet flow;
receive a returned diverse path as computed by the destination device in response to the probe packet; and
forward the packet flow on the primary path and the diverse path to the destination device according to the multi-path forwarding.

17. The apparatus as in claim 16, wherein the process when executed is further operable to:
determine a local neighbor topology of the apparatus;
receive, as a transit device, another probe packet on another primary path from another source device to another destination device;
in response to the other probe packet, add the local neighbor topology to an accumulation within the other probe packet of respective local neighbor topologies of transit devices along the other primary path; and
forward the other probe packet with the associated accumulation of local neighbor topologies toward the other destination device along the other primary path.

18. An apparatus, comprising:
one or more network interfaces to communicate in a computer network;
a processor coupled to the network interfaces and adapted to execute one or more processes; and
a memory configured to store a process executable by the processor, the process when executed operable to:
receive a probe packet of a packet flow from a source device on a primary path for which the apparatus is a destination device, the probe packet carrying an indication that requests that the apparatus as the destination device compute a diverse path of the primary path for the packet flow, wherein the probe packet is an initial packet of the packet flow;
retrieve the primary path of the probe packet;
retrieve, from the probe packet, an accumulation of respective local neighbor topologies of transit devices along the primary path;
compute a diverse path from the primary path based on the accumulation of local neighbor topologies in the probe packet; and
return the computed diverse path to the source device.

19. The apparatus as in claim 18, wherein the process when executed is further operable to:
determine a local neighbor topology of the apparatus;
receive, as a transit device, another probe packet on another primary path from another source device to another destination device;
in response to the other probe packet, add the local neighbor topology to an accumulation within the other probe packet of respective local neighbor topologies of transit devices along the other primary path; and
forward the other probe packet with the associated accumulation of local neighbor topologies toward the other destination device along the other primary path.

* * * * *